United States Patent [19]

Hardage

[11] Patent Number: 4,590,743
[45] Date of Patent: May 27, 1986

[54] TRAY LOADING METHOD AND APPARATUS

[75] Inventor: Timothy W. Hardage, Athens, Ga.

[73] Assignee: Food Machinery Sales, Inc., Athens, Ga.

[21] Appl. No.: 677,745

[22] Filed: Dec. 3, 1984

[51] Int. Cl.$^4$ .......................... B65B 35/44; B65B 35/50
[52] U.S. Cl. ........................................ 53/446; 53/447; 53/532; 53/542
[58] Field of Search .................. 53/447, 446, 443, 542, 53/532, 531; 198/425, 732

[56] References Cited

U.S. PATENT DOCUMENTS

| | | | |
|---|---|---|---|
| 2,247,175 | 6/1941 | Orstrom | 198/31 |
| 3,127,029 | 3/1964 | Luginbühl | 214/8.5 |
| 3,268,054 | 8/1966 | Murphy et al. | 198/20 |
| 3,290,859 | 12/1966 | Talbot | 53/160 |
| 3,500,984 | 3/1970 | Talbot | 198/32 |
| 3,538,992 | 11/1970 | Chauhan | 198/35 |
| 3,927,508 | 12/1975 | Campbell | 53/251 |
| 4,029,198 | 6/1977 | Lingl, Jr. | 198/425 |
| 4,098,392 | 6/1978 | Greene | 198/425 |
| 4,109,569 | 8/1978 | Kemper | 99/483 |
| 4,394,899 | 7/1983 | Fluck | 198/408 |
| 4,398,383 | 8/1983 | Prakken | 53/542 X |
| 4,413,462 | 11/1983 | Rose | 53/540 |
| 4,455,333 | 6/1984 | Hong et al. | 426/94 |
| 4,505,093 | 3/1985 | Johnson | 53/542 X |

*Primary Examiner*—James F. Coan
*Attorney, Agent, or Firm*—Thomas & Kennedy

[57] ABSTRACT

Cookies (18) and the like are moved in a horizontal, as-baked attitude from an oven and are automatically loaded in edge standing attitude in the semicylindrical cavities of a tray (146). The cookies are received in series from the cooling belt (19) that leads away from the oven onto a slick top belt, then moved in sequence to a backlog belt conveyor (22), to a timing belt conveyor (24), to a pin conveyor (12), to a loading wheel (13) and into a loading cell (106) of a turret. The slick top belt operates at approximately the same speed as the cooling belt leading away from the oven, and the backlog belt operates at a slower speed as necessary than the slick top belt so as to accumulate the cookies in edge-to-edge relationship. When the supply of cookies on the backlog belt has accumulated to the point where they are backing up on the slick top belt, the operational speed of the system is increased so that the speed of operation matches the operation of the oven. The timing belt accelerates the cookies received from the backlog belt and delivers each cookie in spaced relationship to the pin conveyor, and the pin conveyor delivers each cookie to a loading wheel that tilts each cookie from a horizontal attitude to an edge standing attitude and delivers each cookie to the cell of the turret. After a predetermined number of cookies has been moved by the timing belt to the pin conveyor, the movement of cookies to the pin conveyor is temporarily interrupted to form a gap in the series of cookies, and when the gap reaches the turret the turret rotates to dump the accumulated cookies to a tray positioned below the turret and to position an empty cell in alignment with the next series of cookies.

26 Claims, 4 Drawing Figures

TRAY LOADING METHOD AND APPARATUS

BACKGROUND OF THE INVENTION

In the baking and packaging of cookies and similar items, dough is deposited on a plurality of parallel conveyor tapes, and the tapes are moved through a baking oven. When the dough emerges from the opposite side of the oven, the dough has been cooked so as to form an edible cookie. Workers then gather a predetermined number of the hot cookies and load them into the semicylindrical cells of cookie trays, and the loaded cookie trays are then placed in a bag and shipped to the retail merchant.

Some cookies of uniform size and shape and with relatively smooth exterior surfaces can be loaded by automatic equipment in the cookie trays. For example, U.S. Pat. No. 3,290,859, 3,500,984, 3,538,992, 3,927,508, 4,098,392, 4,394,899 and 4,413,462 all disclose various automated machines for loading cookies and the like into containers.

The prior devices utilized for automatically loading cookies and the like into trays do not function very well when the cookies are of irregular size and shape. For example, the relatively new home style cookie which is baked with a substantially flat bottom surface but with an irregular top surface is more difficult to load than a cookie which is smooth on both top and bottom surfaces. An example of a home style cookie is disclosed in U.S. Pat. No. 4,455,333, and might include nuts or chocolate chips that form lumps in the top surface of the cookie. The prior art equipment tends to stack and gather the cookies in bundles or groups at various stages prior to loading the cookies in the cell of the cookie tray, and an irregular top surface occasionally causes the equipment to malfunction, or one or more of the cookies are damaged as they are being loaded into a tray.

Typically, the prior art devices accumulate a large number of cookies in stacked relationship, and then a predetermined number of the cookies at the leading end of the stack must be separated from the other cookies by a shearing movement of the compressed stack. While this can be accomplished with cookies having smooth top and bottom surfaces, the more irregularly shaped cookie tends to become damaged and/or the improper number of cookies will be gathered in the group and placed in the cell of the tray.

It is highly desirable to avoid contact between adjacent top and bottom surfaces of adjacent ones of the home style cookies during the stacking process, and when contact is finally made between adjacent cookies, it is desirable that only a minimum contact force be experienced.

SUMMARY OF THE INVENTION

Briefly described, the present invention comprises a tray loading method and apparatus for loading cookies and the like received from the oven in a random spaced, horizontal as-baked attitude. The cookies ultimately are arranged in an accumulated edge standing stacked relationship in the cell of a cookie tray.

The cookies are received from the cooling belt of the oven in random spaced relationship onto a slick top belt, and are moved on the slick top belt at approximately the same speed as received from the oven along a predetermined path to a loading station. A backlog belt receives the cookies from the slick top belt. The backlog belt has a slower surface velocity that causes the cookies to back up onto the slick top belt so that the cookies are received in edge abutment on the backlog belt. As the movement of the cookies is blocked on the slick top belt by the backlog of cookies extending back from the backlog belt, the slick top belt continues its movement and passes beneath the cookies, with the cookies sliding on the surface of the slick top belt. The speed of operation of the backlog belt and the subsequent components of the equipment is controlled by the number of cookies that have backed up from the backlog belt on the slick top belt.

The cookies are transferred from the backlog belt to a pin conveyor that pushes each cookie in equally spaced relationship with respect to adjacent cookies toward a loading turret. As the cookies approach the loading turret they are received in a slot of a loading wheel which reorients each cookie from a horizontal attitude to an edge standing attitude, and each cookie is then deposited in a cell of the loading turret until the prescribed number of cookies have been loaded into the cell.

A control system functions to interrupt the movement of cookies from the backlog belt to the pin conveyor so as to form a gap in the spaced series of cookies moving to the loading turret, and when the gap reaches the loading turret, the loading turret is rotated to present an empty cell to the line of cookies, and to dump the previously received cookies into an awaiting cookie tray positioned below the loading turret.

The cookies are reoriented from the as-baked, horizontal attitude to the edge standing attitude at the last stage of the loading process, so as to avoid contact with the upper, irregular surfaces of the cookies. Moreover, only the prescribed number of cookies are placed in each stack, and then the stack is loaded into the awaiting cookie tray.

Thus, it is an object of this invention to provide an automated loading method and apparatus for receiving cookies with irregularly shaped top surfaces in a horizontal, as-baked attitude and turning each cookie to an edge standing attitude just prior to loading the cookies into an awaiting tray, substantially without hazard of damaging the irregularly shaped top surfaces of the cookies.

Another object of this invention is to provide a method and apparatus for loading cookies and similarly shaped items into a container in a high speed, reliable operation, substantially without hazard of damaging the cookies or improperly loading the cookies in the awaiting cookie container.

Another object of this invention is to provide a unique combination of elements which function in a novel manner to inexpensively and reliably load an awaiting container with cookies and similarly shaped items received from a cookie baking oven or the like.

Other objects, features and advantages of the present invention will become apparent when reading the following specification, when taken in conjunction with the accompanying drawing.

DETAILED DESCRIPTION

Figure 1A:
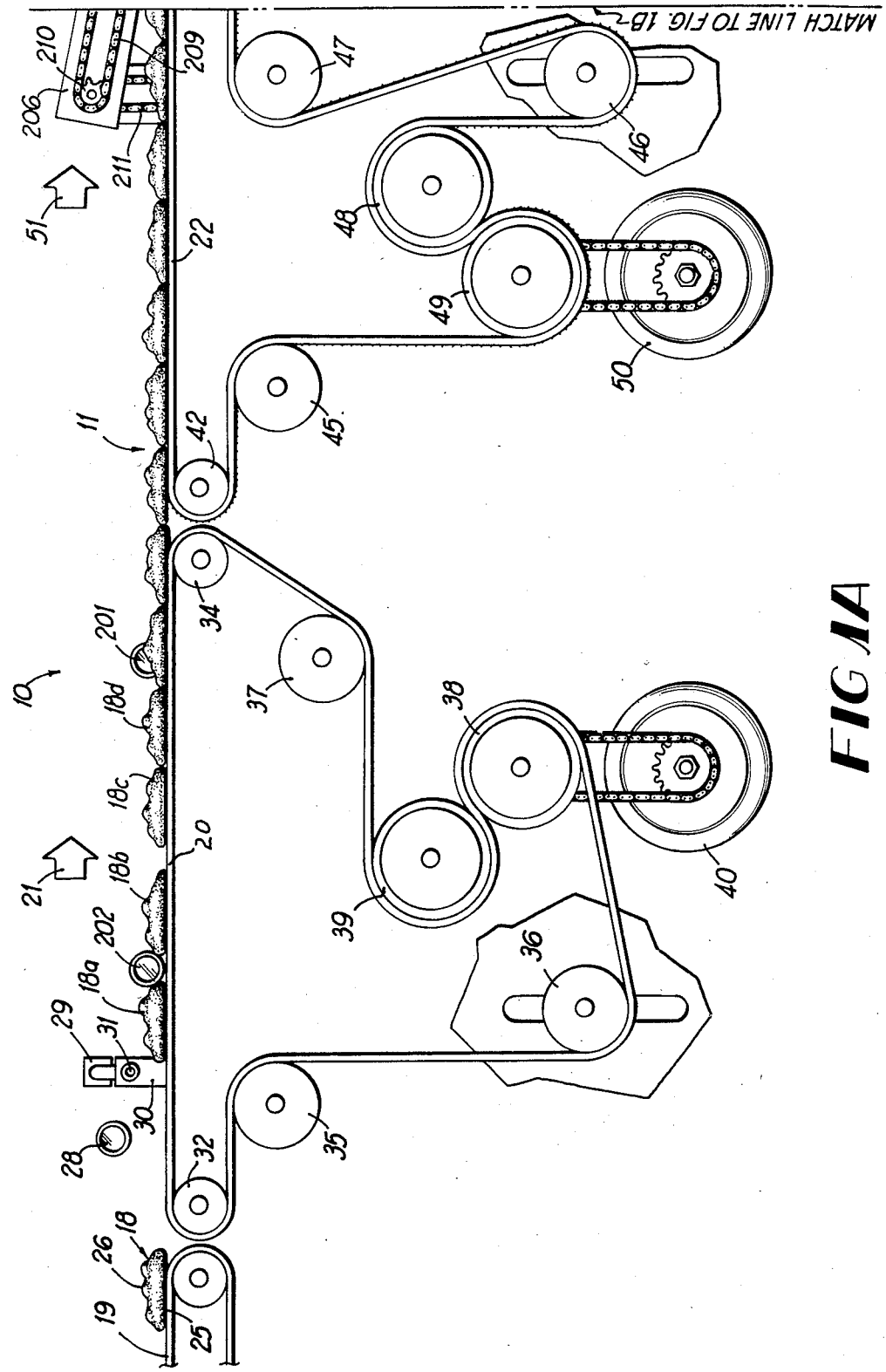
FIGS. 1A and 1B are side schematic illustrations of the tray loading method and apparatus, showing cookies as they are received in a horizontal, as-baked attitude from the cooling belt of the oven, and illustrating the manner in which the cookies are properly spaced apart for reorientation into an edge standing attitude and then into a horizontal stack, and then loaded into an awaiting cookie tray.
Figure 1B:
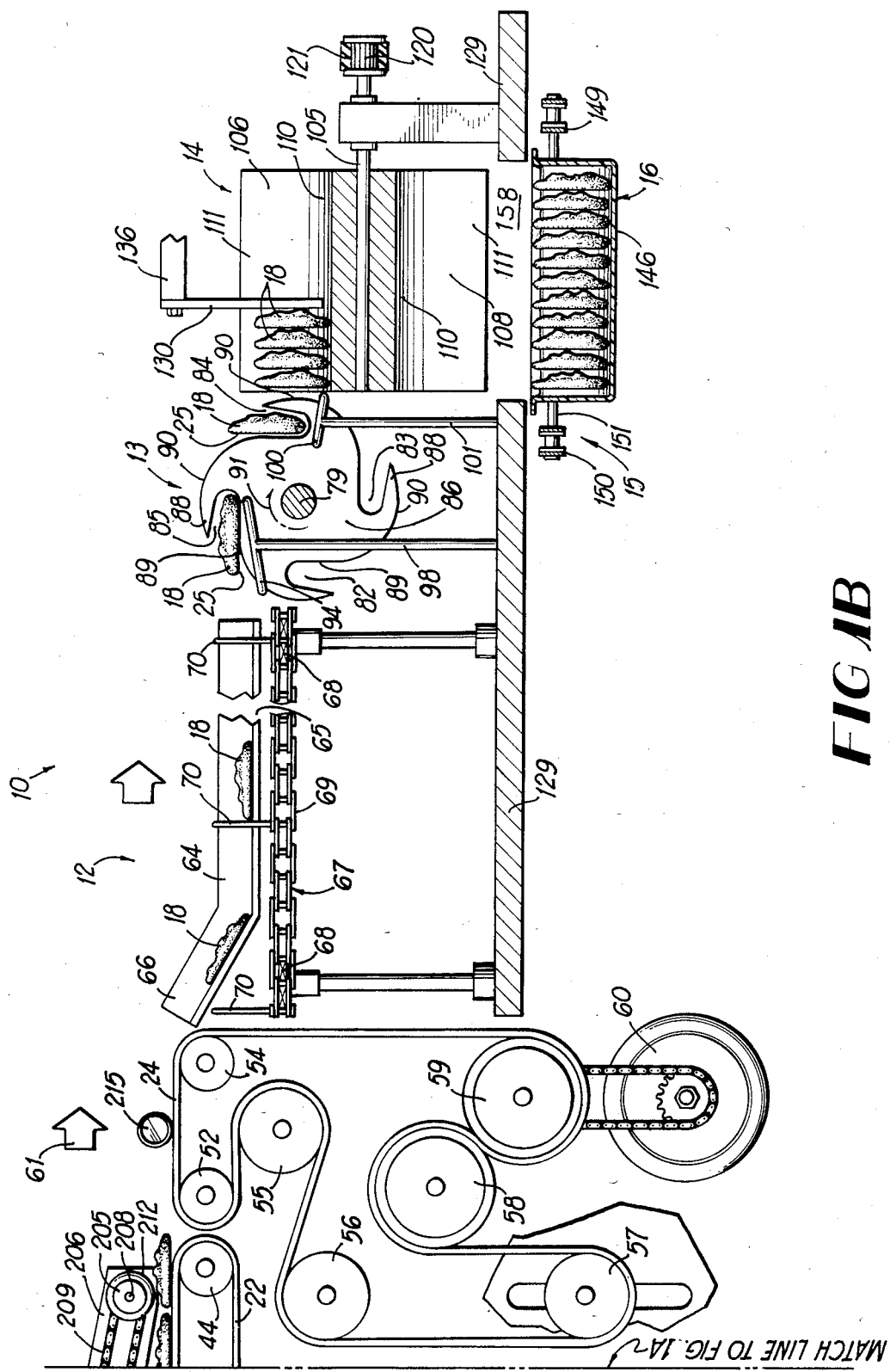

Referring now in more detail to the drawings, in which like numerals indicate like parts throughout the several views, FIGS. 1A and 1B illustrate a side elevational schematic view of the tray loading method and apparatus 10 which includes a surface conveyor system 11, a pin conveyor 12, a loading wheel 13, a loading turret 14 and a bar conveyor 15 for moving cookie receptacles or trays 16 to which the cookies are delivered.

As illustrated in FIG. 1A, cookies 18 are received from the cooling conveyor belt 19 of the cookie baking oven (not shown) onto a slick top belt conveyor 20, are moved from left to right as indicated by arrow 21 to the backlog belt conveyor 22, to the timing belt conveyor 24, and to the pin conveyor 12. The cookies 18 are still hot from having recently passed through the baking oven as they are received from cooling belt 19, and each cookie 18 has a substantially flat bottom surface 25 and an irregularly shaped top surface 26. The cookies are received in an as-baked attitude, in that as the cookies were baked they developed a flat bottom that conformed to the flat surface of the oven surface conveyor, and the top surface of the cookie became irregularly shaped because of the filling of nuts, chocolate chips or other objects that protrude upwardly in the cookie filling.

The cookies are moved along the cooling belt 19 in series, but in a random spaced relationship, and as the cookies pass through the various other conveyor means that might be positioned between the oven and the tray loading method and apparatus 10, the spacing becomes even less reliable. Therefore, when the cookies 18 are transferred onto the slick top belt 20, they are received on the belt 20 in a random spaced, approximately aligned arrangement, in series.

Occasionally, one cookie will be stacked on top of another cookie. As illustrated in FIG. 1A, a photocell 28 is positioned slightly above the normal height of the cookie thickness when placed upon the slick top belt 20 so as to detect the presence of one cookie stacked on top of another cookie. Photocell 28 functions as a means for detecting the upper cookie in a stack of cookies, and photocell 28 functions through a control system (not shown) to open a valve 29 connected to air nozzle 30. A source of air under pressure (not shown) communicates with valve 30, and the nozzle opening 31 is aimed across the slick top belt 20 at a level that would direct a stream of high velocity air across the upper surface of a cookie, such as cookie 18A, so that any cookie that is stacked on top of cookie 18A would be wiped off the cookie 18A by the air stream. Thus, photocell 28 and its related elements 29-31 function as a means for ejecting any cookie stacked on top of one of the cookies 18 moving along the surface conveyor system.

Slick top belt 20 is fabricated from conventional conveyor tape material with a coating of polyurethane on its top or working surface. A commercially available belt of this type is sold under the trade name of Habasit TP10. The surface of the belt forms a slick support surface for the cookies 18 as they are moved by the slick top belt on into the tray loading apparatus.

Slick top belt 20 extends about end rollers 32 and 34, about guide rollers 35, 36 and 37, and about drive rollers 38 and 39. One of the drive rollers 38 or 39 is driven by motor 40 so as to cause the conveying surface of the slick top belt 20 to move in the direction as indicated by arrow 21. Under normal circumstances, the slick top belt will operate continuously and the surface velocity of slick top belt 20 will be approximately the same as the surface velocity of cooling belt 19.

Backlog belt conveyor 22 is similar to slick top belt conveyor 20 in that it includes end rollers 42 and 44, guide rollers 45, 46 and 47 and drive rollers 48 and 49. Motor 50 is connected to one of drive rollers 48 or 49 and functions to rotate its drive roller in the direction that causes the conveying surface of backlog belt conveyor 22 to move in the direction as indicated by arrow 51. As will be described in more detail hereinafter, the operation of backlog conveyor 22 is intermittant so as to form a backlog of cookies extending rearwardly from the backlog conveyor onto the delivery end of slick top conveyor 20.

Motor 50 causes backlog belt conveyor 22 to operate at a slower surface speed than that of slick top belt conveyor 20. This causes the cookies moving from slick top belt conveyor 20 onto backlog belt conveyor 22 to accumulate in edge abutting relationship on backlog belt conveyor 22. As the system continues to operate, the cookies 18 continue to accumulate not only on backlog belt conveyor 22 but to also back up onto slick top belt conveyor 20, as illustrated by the cookies extending along the path from cookie 18A and 18B. It will be seen that cookie 18C has caught up with cookie 18D and abuts the trailing edge of cookie 18D, whereas cookie 18D and those that preceded cookie 18D are already in edge-to-edge relationship as they pass from slick top belt conveyor onto backlog conveyor 22.

By virtue of the fact that the conveying surface of slick top belt conveyor 20 is very slick, the belt tends to slide beneath those cookies 18C, 18D and the proceeding cookies that still remain on the belt, so that cookies 18B and 18A will approach cookie 18C. Therefore, as long as the surface velocity of slick top belt conveyor 20 is sufficiently greater than the surface velocity of backlog belt conveyor 22, the cookies will remain backlogged or accumulated in edge-to-edge relationship at the delivery end of slick top belt conveyor 20.

As illustrated in FIG. 1B, timing belt conveyor 24 includes end rollers 52 and 54, guide rollers 55, 56 and 57, and drive rollers 58 and 59. Motor 60 functions to drive one of the drive rollers 58 or 59, to move the conveying surface of timing belt conveyor in the direction as indicated by arrow 61. The timing belt conveyor 24 is a relatively short conveyor, operates at a higher surface velocity than backlog belt conveyor 22 so as to form spaces between the cookies, and functions to transfer the cookies 18 from the backlog conveyor 22 to the pin conveyor 12.

Figure 2:
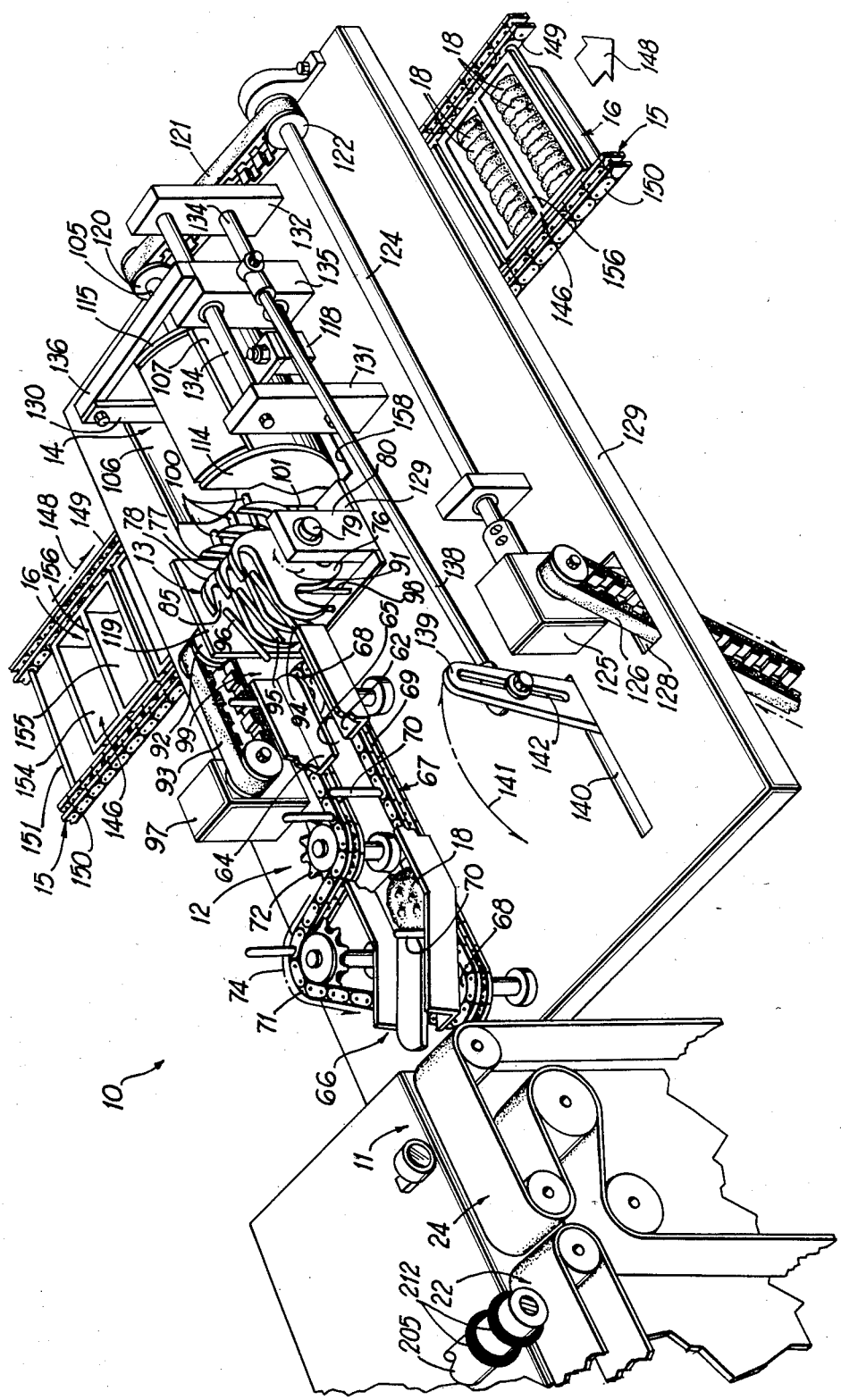
FIG. 2 is a perspective illustration of the pin conveyor, loading wheel and loading turret, and their related components.

As illustrated in FIG. 2, pin conveyor 12 comprises a pair of tracks or rails 62 and 64 which are parallel to each other and which are L-shaped in cross-section and which form a channel shaped track that defines a slot 65 therebetween. The tracks 62 and 64 extend from timing belt conveyor 24 to loading wheel 13, with the entrance portion 66 of the tracks 62 and 64 being inclined downwardly from the timing belt conveyor 24, and with the remaining portion of the tracks being oriented in an approximately horizontal attitude toward loading wheel 13. A continuous pin chain 67 is positioned at a level below tracks 62 and 64. Sprockets 68 are mounted beneath the ends of track 64 and the pin chain 67 extend about the end sprocket 68. One flight 69 of the chain extends parallel to and aligned with the slot 65 of the tracks 62 and 64. A series of conveyor pins 70 are each mounted at their lower ends and extend upwardly from the pin chain 67. The conveyor pins 70 are equally spaced along the length of pin chain 67 and the upper ends of the conveyor pins protrude upwardly through the slot 65 between the tracks 62 and 64.

Track 64 of pin conveyor 12 is rounded at its ends so as to accomodate the movement of the conveyor pins around the ends of the track. The return flight 71 of the pin chain 67 is displaced to the side of track 62 amd 64, and the chain is driven by spur gear 72 in the direction as indicated by arrow 74. At the entrance end 66 of tracks 62 and 64, the height of the track 64 above the path of the conveyor pins 70 is such that the pins can pass beneath track 64 if necessary, so as to become located beneath the slot 65 just as they begin the longitudinal movement along the length of slot.

The cookies 18 are moved from timing belt 24 onto the tracks 62 and 64, and the downward slope of the tracks assures that the cookies will continue their movement along the system while a pin 70 is moved into a position behind the cookie. Each pin 70 moves in behind a cookie that is delivered to the tracks by the timing belt 24, and since the pins are equally spaced apart along the length of pin chain 67, the cookies 18 are pushed along the tracks in equally spaced relationship.

Loading wheel 13 comprises three star wheels 76, 77 and 78 which are maintained in spaced apart relationship so as to form slots therebetween, with the star wheels 76-78 being mounted on axle 79. Axle 79 is mounted at its ends on similar supports 80, and the axle 79 extends across the path of pin conveyor 12.

As best illustrated in FIG. 1B, the star wheels 76, 77 and 78 of the loading wheel 13 are all similarly shaped and are aligned with one another, with each star wheel including four cookie receiving slots 82, 83, 84 and 85 at 90° intervals about the star wheel, with each slot being formed between the central portion 26 of a star wheel and a circumferentially extending finger portion 88. Each slot 82-85 is sized and shaped to receive a cookie 18 therein, with the relatively flat inner surface 89 of each slot arranged to receive the relatively flat bottom surface 25 of the cookie. The outer rounded surface 90 of each finger portion 88 extends radially inwardly toward and about axle 79 from the tip of one finger as it approaches the slot of the next preceding finger, such that the rounded surface 90 forms a cam surface. The loading wheel 13 rotates in the direction as indicated by arrow 91. Sheeve 92 is mounted to axle 79 and is driven by timing belt 93, with timing belt 93 being driven by gear box 97 and its sheave (FIG. 2).

As shown in FIG. 2, transfer fingers 94, 95 and 96 are located in the slots between star wheels 76, 77 and 78, with each transfer finger being mounted on a support stem 98 and extending from the delivery end 99 of the pin conveyor 12 into a slot of the loading wheel 13. The transfer fingers function to guide each cookie 18 from the delivery end of pin conveyor 12 into a cookie receiving slot 82-85 of the loading wheel 13 as each slot presents itself to the delivery end of the pin conveyor.

The movement of the conveyor pins is timed with the movement of the loading wheel so that each pin 70 accurately urges its cookie into a slot of the loading wheel, and as the loading wheel 13 continues its rotation in the direction as indicated by arrow 91, the cookie is reoriented from its approximately horizontal, as-baked attitude to an edge standing attitude as illustrated to the right of loading wheel 13.

A plurality of release fingers 100 are also loacted in the slots between star wheels 76, 77 and 78, but on the other side of the axle 79 of the loading wheel. Each release finger 100 is supported on a stem 101 in a stationary position, with each release finger being inclined downwardly from the loading wheel 13 toward loading turret 14, and positioned in the path of the cookies 18 carried by the loading wheel. The downwardly inclined attitude of the release fingers 100 tends to guide each cookie downwardly and to the right, away from loading wheel 13 and toward loading turret 14. The rounded cam surface 90 that follows each slot 82-85 tends to press against the substantially flat bottom surface 25 of each cookie 18 as the cookie is being transferred by the loading wheel 13 to the loading turret 14. In this manner, the release fingers 100 tend to rake and guide each cookie away from the loading wheel as it is pushed by the loading wheel on further into the loading turret 14.

Loading turret 14 is rotatably mounted on axle 105 and comprises four loading cells 106, 107 and 108 (the fourth loading cell is not shown), with the loading cells being oriented at 90° intervals about the axle 105. Each loading cell is open at its ends through the loading turret 14, with a concave inner surface 110, and with approximately flat sidewalls 111 adjacent the outer surface of the loading turret. The curvature of the concave inner surface 110 of the loading cells generally conforms to the shape of the peripheral edge of the cookies 18.

As illustrated in FIG. 2, end plates 114 and 115 are closely spaced adjacent the ends of loading turret 14, and arcuate bonnet 116 is joined at its ends to end plates 114 and 115. Bonnet 116 covers the curved exterior surface of loading turret 14 in the lower right hand quadrant (FIG. 2) of the loading turret, so that the cookies in a loading cell will not fall out of the loading cell during the movement through the lower quadrant toward an inverted cell position. Support 118 mounts the end plates and arcuate bonnet 116 in a stationary position with respect to the rotatable loading cell 14. Guide plates 119 (only one shown) are positioned on opposite sides of loading wheel 13 so as to guide the cookies to the loading wheel.

Sheave 120 of loading turret 14 is mounted to axle 105 and is driven by timing belt 121 (FIG. 2) which in turn is driven by sheave 122, drive shaft 124 and gear box 125. Gear box 125 is driven by timing belt 126 and belt 126 extends through the opening 128 of work table 129. This controls the periodic rotation of loading turret 14.

Lead finger 130 is suspended so as to reciprocate along the length of the upwardly facing loading cell of loading turret 14. As illustrated in FIG. 2, a pair of supports 131 and 132 are mounted on work table 129, and guide rods 134 are suspended at their ends in supports 131 and 132. Guide rods 134 are parallel to one another and oriented in a horizontal attitude. Slide block 135 defines openings therethrough which are mounted on guide rods 134, so that slide block 135 can slide between supports 131 and 132. Support arm 136 is rigidly fastened at one of its ends to the upper surface of slide block 135 and its other end is suspended in cantilever fashion over loading turret 14. Lead finger 130 is rigidly mounted at its upper end to support arm 136, with the lower end of lead finger projecting down into the upwardly facing loading cell of the loading turret. Connecting arm 138 is connected at one end to slide block 135, and its other end is connected to crank 139. Crank 139 extends upwardly from beneath work table 129 and through opening 140, and is arranged to oscillate as indicated by arrow 141.

The oscillation of crank 139 causes slide block 135 to reciprocate along its guide rods 134, causing lead finger 130 to move along the length of the upwardly facing load cell. The upper end portion of crank 139 that protrudes above the work table 129 defines a slot 142, and the connection of the connecting arm 138 to crank 139 is made in the slot 142. This connection can be moved along the length of the slot, thereby changing the ampitude of movement of the connection arm 138, slide block 135 and lead finger 130.

The arrangement of the crank 139 and the intermediate elements that control lead finger 130 is such that the lead finger 130 moves beyond the end of the upwardly facing loading cell of the loading turret 14 so as to permit the loading turret to rotate without interference from the lead finger.

Bar conveyor 15 is positioned at a level beneath work table 129 and functions to move a series of containers or cookie trays 146 beneath the work table 129 in the direction as indicated by arrow 148. Bar conveyor 15 comprises a pair of parallel conveyor chains 149 and 150, and a series of spaced bars 151 that are connected at their ends to the chains 149 and 150. The cookie trays 146 each comprise a pair of semicylindrical cavities or cells 154 and 155 with the cells being connected together by a ridge 156. This forms on the bottom surface of the tray and upwardly extending recess, and the cookie trays are placed on the bar conveyor with the upwardly extending recesses resting on the bars 151. Therefore, the cookie trays are adequately supported in a horizontal arrangement and are progressively moved beneath the work table 129.

As illustrated in FIG. 1B, an opening 158 is formed in the work table 129 immediately beneath loading turret 14, with the opening permitting free communication between the loading turret 14 and a cookie tray 146 therebeneath. The arrangement is such that when a loading cell of turret 14, such as cell 106, has been fully loaded with cookies and the loading turret 14 is rotated on its axle 105 so that the loaded cell is inverted, the cookies from the loaded cell will be dumped through the opening 158 of the work table and received in a cell 154 or 155 of a cookie tray.

Figure 3:
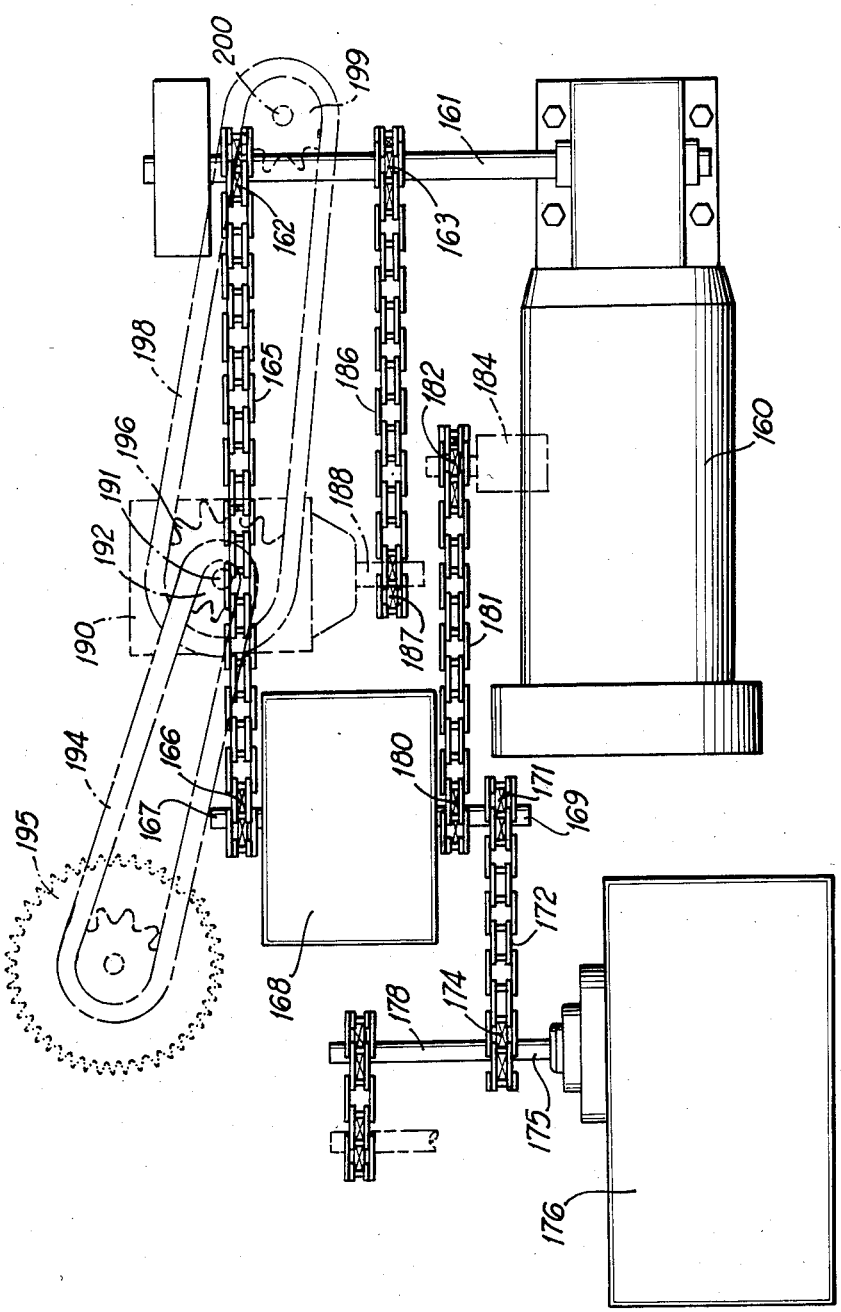
FIG. 3 is a schematic illustration of the drive system that operates to drive the pin conveyor, loading wheel, loading turret and bar conveyor in timed relationship.

Main drive motor 160 is located beneath the work table 129, and as illustrated in FIG. 3, main drive motor 160 is connected by means of its motor drive shaft 161 to drive sprockets 162 and 163. Drive sprocket 162 drives the drive chain 165, and drive chain 165 rotates driven sprocket 166 and its shaft 167 of reducer 168. The output shaft 169 of the reducer 168 rotates one revolution for each seventeen revolutions of the input shaft 167.

Drive shaft 169 of reducer 168 is connected by means of its sprocket 171 to drive chain 172 to the sprocket 174 of input shaft 175 of the epicycle drive 176. The output shaft 178 of epicycle drive 176 is connected to crank 139 that operates lead finger 130 (FIGS. 1B and 2). The epicycle drive is known under the trademark as a Camco drive system, and functions to move the lead finger rapidly in one direction and slowly in the opposite direction. With this arrangement, when an empty cell of the loading turret 14 is rotated up to an upwardly facing attitude, the lead finger can be moved quickly from adjacent the end of the loading turret through the loading cell toward the loading wheel 13, where it will be located adjacent the area of the loading cell where the first cookie is to be received from the loading wheel into the loading cell. When the first cookie is received and subsequent ones of the cookies begin to be received, the epicycle drive will slowly move its crank 139 and therefore the lead finger 130 in the opposite direction, so that the lead finger 130 progressively moves with the flow of cookies through the loading cell, thereby accomodating additional cookies in the loading cell as the cookies move from the loading wheel 13 into the loading turret 14. This maintains the cookie first delivered to the loading cell in an edge standing attitue, and the first cookie supports the second and the second the third, and so on, so that all of the cookies remain in an edge standing attitude within the loading cell. By the time the loading cell is filled with cookies, the lead finger 130 will have moved slightly beyond the end of the loading turret, so that the rotation of the loading turret will not be hampered by the lead finger.

The output shaft 169 of reducer 168 is also connected to drive sprocket 180, which is connected through drive chain 181 and driven sprocket 182 to a gear box 184. The gear box 184 operates timing belt 126 (FIG. 2) that operates the gear box 125 on the surface of work table 129. The gear box 125 is an intermittant motion box and rotates its shaft 124 at timed intervals which are coordinated with the movement of lead finger 130.

Sprocket 163 that is also driven by main drive motor 160 is connected by driven chain 186 to the sprocket 187 and shaft 188 of the gear box 190. The output shaft 191 of gear box 190 and its sprocket 192 are connected to drive chain 194, and drive chain 194 rotates the larger sprocket 195. Larger sprocket 195 operates the gear box 97 on the surface of work table 129, and the gear box 97 causes rotation of the loading wheel 13. A second larger sprocket 196 mounted to drive shaft 191 of gear box 190 drives chain 198 which is connected to sprocket 199. Sprocket 199 is connected to drive shaft 200, which is the drive shaft that operates the drive gear 72 of the pin chain 67 of pin conveyor 12.

It will be noted that the main drive motor 160 is the power source that drives the epicycle drive 176 that controls the movement of lead finger 130, the indexer drive 184 that controls the rotation of loading turret 14, the loading wheel 13 and the pin conveyor 12. All of these elements are driven in timed relationship with respect to one another and independently of the timing and movement of the belt conveyor system that feeds cookies to these elements. Also, main drive motor 160 is connected in driving relationship (not shown) to bar conveyor 15, so that bar conveyor 15 is also driven in timed relationship with the other components driven by main drive motor 160.

As illustrated in FIG. 1A, first and second photocells 201 and 202 are positioned so as to detect the cookies as they are moved by the slick top belt conveyor 20. Photocell 201 is located adjacent the delivery end of slick top belt conveyor 20, while photocell 202 is located back upstream from cell 201. The photocells 201 and 202 are part of a control system that controls the speed of main drive motor 160 and the motors 50 and 60 of the backlog belt conveyor 22 and the transfer belt conveyor 24. When the cookies 18 are delivered from the cooling belt 19 onto the slick top belt 20 which is moving at approximately the same surface speed as the cooling belt, they are carried to the backlog belt conveyor 22. If backlog belt conveyor 22 is not yet in operation, the first few cookies might be moved off the end of slick top belt 20 onto the backlog belt conveyor, but eventually the movement of those cookies moving onto backlog belt conveyor 22 will terminate. This tends to back up the oncoming cookies onto slick top belt 20, so that photocell 201 eventually will detect one cookie for a predetermined time. This initiates the movement of backlog belt 22 for as long as photocell 201 detects cookies moving on slick top belt 20 in an end-to-end relationship. Also, motor 60 for timing belt 24 is initiated and the main drive motor 160 for the pin conveyor 12, loading wheel 13 and loading turret 14 also is energized so as to begin the loading function. This condition continues for as long as photocell 201 detects the movement of cookies in an edge-to-edge relationship. Should photocell 201 begin to detect gaps between the cookies, the operation of motors 50, 60 and 160 will terminate. On the other hand, should the cookies 18 continue to accumulate on the slick top belt 20, the motors 50, 60 and 160 will continue their operation and photocell 202 which is back up the path from photocell 201 eventually will begin to detect the backlog of cookies on the slick top belt in edge-to-edge relationship. This causes motors 50, 60 and 160 to shift into high speed operation and to load the cookies at a faster rate.

When the backlog of cookies on the slick top belt is partially depleted so that the photocell 202 does not detect cookies in edge-to-edge relationship, the speed of operation of the backlog belt conveyor 22, timing belt conveyor 24, pin conveyor 12, loading wheel 13 and loading turret 14 will be decreased.

The standard feed rate from a typical cookie oven is between 150-190 cookies per minute. The low and high speeds of the tray loading apparatus has been set at between five and seven percent below the low speed operation of the oven and between five and seven percent above the high speed operation of the oven. With this arrangement, the tray loading apparatus will continually change between high speed and low speed operation so as to continually compensate for the indefinite delivery rate of cookies from the oven.

The reducer 168 (FIG. 3) requires seventeen revolutions input to accomplish one revolution output. This particular ratio has been chosen as an example for loading eleven cookies in each cell of a cookie tray. The backlog belt conveyor 22 is energized to run continuously for a period sufficient to move eleven cookies onto transfer belt conveyor 24. Timing belt conveyor 24 immediately transfers the cookies to the pin conveyor 12, and the continuing series of cookies is moved on through the system and loaded into the cookie tray. After eleven cookies have been counted and started from backlog belt conveyor 22, the operation of backlog belt conveyor 22 is interrupted for a count of six cookies, so that no cookies are moved from backlog belt conveyor 22 onto transfer belt conveyor 24. This forms a gap in the series of cookies moving through the pin conveyor 12, loading wheel 13 and loading turret 14. As the gap in the series of cookies reaches loading turret 14, the upwardly facing loading cell of the loading turret 14 will be filled with cookies and the loading turret will then be rotated 90°. This presents an empty loading cell in the upright position. In the meantime, the previously loaded cells are moved first to a 90° position, and after another cycle, to the downwardly facing 180° position, where the cookies are dumped from the loading cell through the opening 158 into the cell of a cookie tray. The gap in the series of cookies permits the loading turret to function without interference with oncoming cookies. In the meantime, the timing belt conveyor 24, pin conveyor 12 and loading wheel 13 continue their normal operation even though no cookies are being passed to the loading turret 14.

After a full count of seventeen cookies, eleven of which are delivered by the system and six of which were not delivered, backlog belt conveyor 22 resumes its operation and delivers eleven more cookies to the system, and these cookies are progressively reoriented from the horizontal, as-baked attitude to an edge standing attitude and loaded in an edge standing attitude in the awaiting cookie tray as previously described.

Inasmuch as the backlog belt conveyor abruptly starts and stops as it delivers and then interrupts the delivery of cookies to the timing belt conveyor 24, there are times when the cookie at the delivery end of the backlog belt conveyor might accidentally slide off the end of backlog belt conveyor onto the timing belt conveyor 24. In order to avoid the inadvertant transfer of an extra cookie into the system, and to further control the cookie being moved off the end of the backlog belt conveyor 22, a speed control roller 305 (FIG. 1B) is positioned above the delivery end of backlog belt conveyor 22. Speed control roller 205 is mounted on the end of adjustable arm 206, and the roller is rotatable about its axle 208 that extends across the path of the cookies moving on the backlog conveyor 22. Drive chain 209 is arranged to rotate speed control roller 205, and the drive chain 209 is driven by sprocket 210 which, in turn, is driven by another sprocket (not shown) and its chain 211. Chain 211 is driven by motor 50.

The surface speed of speed control roller 205 is matched with the surface speed of backlog belt 22, so that these elements are driven in unison. For example, when the movement of backlog belt 22 is stopped, speed control roller 205 is also stopped. This tends to prevent accidental movement of the cookie at the delivery end of the backlog belt conveyor 22 from moving onto timing belt conveyor 24. When operation of backlog belt conveyor 22 is resumed, speed control roller 205 will also begin its rotation, thereby positively urging the cookies from backlog belt conveyor 22 onto transfer belt conveyor 24. Elastic bands 212 are wrapped about the end portions of speed control roller 205 so as to lightly engage the irregular top surface of the cookies, and to space the hard metal surface of the roller away from the cookies to avoid damage to the cookies. If it is discovered that the cookies are being damaged by contact from speed control roller 205, the roller can be raised slightly so as to reduce the force applied to the cookies. In this manner, the speed control roller 205 functions as a cookie movement control means, and the timing belt conveyor 24 functions as a transfer means for transferring the cookies in timed relationship from the backlog belt conveyor 22 to the pin conveyor 12.

Motor 60 of timing belt conveyor 24 is driven in timed relationship with main drive motor 160 and pin conveyor 12. Photocell 215 detects the presence and position of a cookie being transferred from the backlog belt conveyor 22 to the pin conveyor 12, and accelerates the cookie as necessary so that the cookie is properly positioned ahead of a conveyor pin 70 when the cookie is received in the pin conveyor 12. Thus, should there be a slight variation in the timing of the cookie delivered from the backlog belt conveyor 22 to the timing belt conveyor 24, an adjustment will be made by changing the speed of timing belt conveyor 24 so that the cookie will be delivered in proper timed relationship to the pin conveyor.

While this invention has been disclosed as a method and apparatus for loading cookies into cookie trays, it should be understood by those skilled in the art that similar shaped items can be handled by the system, and the container that receives the items does not have to be a cookie tray but can be some other kind of receptacle. While the system is capable of reliably handling cookies with irregular shaped top surfaces, other items with flat surfaces are easily handled by the system.

Although the invention has been described in the form of a preferred embodiment, many modifications, additions, and deletions, may be made thereto without departure from the spirit and scope of the invention, a set forth in the following claims.

What is claimed is:

1. A method of loading cookies and the like each having substantially flat bottom surface and an opposed irregularly shaped upper surface in a receptacle comprising the steps of moving a plurality of cookies each resting on its bottom surface in an aligned random spaced series with a first surface conveyor means at a first velocity toward a second surface conveyor means, transferring the cookies from the first surface conveyor means to the second surface conveyor means with the cookies each resting on its bottom surface on the second surface conveyor means, moving the cookies with the second surface conveyor means at a second velocity which is less than the first velocity to receive the cookies on the second surface conveyor means in edge abutment with respect to one another, transferring the cookies from the second surface conveyor means to a third surface conveyor means with the cookies each resting on its bottom surface on the third surface conveyor means, moving the cookies with the third surface conveyor means at a third velocity which is greater than the second velocity to a reorienting means, retrieving the cookies with the reorienting means from the third surface conveyor means and placing a predetermined number of cookies with the reorienting means in an edge stacked relationship in a cell of a transfer member and engaging with the reorienting means the flat bottom surface of each cookie to urge each cookie into the cell of the transfer member, transferring the stack of cookies from the transfer member to a cell of a receptacle.

2. The method of claim 1 and wherein the step of moving the cookies with the second conveyor means comprises moving the cookies at a velocity which causes the cookies to back up from the second conveyor means to the first conveyor means, and further including the steps of detecting a backup of cookies from said second conveyor means on the first conveyor means at a distance from the second conveyor means, and increasing the velocity of movement of said second conveyor means in response to the detection.

3. The method of claim 1 and further including the steps of periodically terminating the transfer of cookies from the second conveyor means to the third conveyor means to create a gap in the series of cookies, and wherein the step of transferring the stack of cookies from the transfer member to the cell of a receptacle comprises transferring the cookies as the gap in the series of cookies reaches the transfer member.

4. The method of claim 1 and wherein the step of placing a predetermined number of the cookies in a cell of a transfer member comprises placing the cookies in sequence into an upwardly facing cell of a transfer turret, as the cookies are placed in the cell of the turret moving a lead finger progressively away from the area of the cell of the turret where the cookies are received so as to hold the first cookie in an edge standing attitude as subsequent cookies are placed in the cell of the turret, and wherein the step of transferring the cookies from the transfer member to a cell of a receptacle comprises rotating the turret about a horizontal axis to move the upwardly facing cell of the turret toward a downwardly facing attitude and dumping the cookies from the cell of the turret to the cell of the receptacle.

5. The method of claim 4 and further including the step of moving receptacles in series beneath the turret for receiving stacked cookies from the cell of the turret.

6. A method of loading cookies and the like in a receptacle comprising the steps of moving a plurality of cookies in a horizontal attitude in an aligned random spaced series with a first conveyor means at a first velocity toward a second conveyor means, transferring the cookies from the first conveyor means to the second conveyor means, moving the cookies with the second conveyor means at a second velocity which is less than the first velocity to receive the cookies on the second conveyor means in edge abutment with respect to one another, transferring the cookies from the second conveyor means to a third conveyor means, moving the cookies with the third conveyor means at a third velocity which is greater than the second velocity to a reorienting means, detecting the presence of at least two cookies with one stacked on top of the other as the cookies move toward the reorienting means and removing the cookies in the upper part of the stack in response to the detection, placing a predetermined number of cookies with the reorienting means in an edge stacked relationship in a cell of the transfer member, and transferring the stack of cookies from the transfer member to a cell of a receptacle.

7. A method of loading cookies and the like each having a substantially flat bottom surface and an opposed irregularly shaped upper surface in edge standing horizontal stacks into a cell of a container comprising moving cookies while resting on their flat bottom surfaces in substantially equally spaced series toward an upwardly facing elongated semi-cylindrical cell of a rotatable turret, as each cookie approaches the cell reorienting the cookie from a horizontal attitude to an edge standing attitude with its irregularly shaped surface leading its flat surface and depositing the cookie in one end of the cell of the turret and urging flat surface of the previously deposited cookie away from the one end of the cell substantially without making contact between the cookie being deposited in the cell and the previously deposited cookie until the cookie being deposited in the cell has been reoriented to an edge standing attitude and is positioned in the cell, and after a predetermined number of cookies have been deposited, rotating the turret until the cell approaches a downwardly facing attitude, and dumping the cookies from the cell of the turret to the cell of a container positioned below the turret.

8. The method of claim 7 and further including the step of supporting the first cookie deposited in the cell in an edge standing attitude with a lead finger and progressively moving the lead finger away from the one end of the cell as additional cookies are deposited in the cell.

9. A container filled with cookies with the method of claim 7.

10. The method of claim 7 and wherein the steps of reorienting and depositing the cookie comprise receiving the cookie in the gap of a delivery wheel and rotating the wheel about a horizontal axis to reorient the cookie, and raking the cookie out of the delivery wheel and pushing the cookie with the delivery wheel into the cavity of the turret.

11. The method of claim 7 and further including the step of moving a series of containers in sequence beneath the turret with cookie-receiving cells of the containers facing upwardly for receiving the cookies from the turret.

12. The method of claim 7 and wherein the step of moving the cookies in equally spaced series comprises periodically forming a gap in the series of cookies moving toward the turret, and wherein the step of rotating the turret comprises rotating the turret as the gap in the series of cookies reaches the turret.

13. A method of loading cookies and the like in edge standing horizontal stacks into a cell of a container comprising moving cookies in equally spaced series and in a horizontal attitude toward an upwardly facing elongated semi-cylindrical cell of a rotatable turret, as each cookie approaches the cell reorienting the cookie from a horizontal attitude to an edge standing attitude and depositing the cookie in one end of the cell of the turret and urging the previously deposited cookie away from the one end of the cell substantially without making contact between the cookie being deposited in the cell and the previously deposited cookie until the cookie being deposited in the cell has been reoriented to an edge standing attitude and is positioned in the cell, supporting the first cookie deposited in the cell in an edge standing attitude with a lead finger and progressively moving the lead finger out of the cell when a predetermined number of cookies have been deposited in the cell, and after a predetermined number of cookies have been deposited, rotating the turret until the cell approaches a downwardly facing attitude, and dumping the cookies from the cell of the turret to the cell of a container positioned below the turret.

14. Apparatus for loading cookies and the like in a receptacle comprising a loading turret rotatable about an approximately horizontal axis, said turret including at least one loading cell extending longitudinally of said turret, surface conveyor means for moving cookies in a horizontal as-baked attitude along a path in series toward said turret, a loading wheel rotatable about a horizontal axis extending across the path and having at least one slot for receiving a cookie from said conveyor means in an approximately horizontal attitude and for reorienting the cookie to an edge standing attitude, means for urging the cookie from said loading wheel into the loading cell of said turret as the cookie moves into an edge standing attitude, drive means for operating said surface conveyor means, said loading wheel and said turret in timed relationship, said surface conveyor means comprising a first belt conveyor means and a second belt conveyor means aligned with said first belt conveyor means for receiving cookies from said first belt conveyor means, roller means positioned above said second belt conveyor means with its axis of rotation extending across the path of the cookies carried by said second belt conveyor means, said roller being supported at a height which permits the roller to engage the top surface of the cookies carried by said second belt conveyor means, said roller being rotated in timed relationship with said second belt conveyor means whereby said roller helps to control the movement of a cookie that is to be received by said loading wheel.

15. The method of loading cookies and the like in a receptacle comprising moving a plurality of cookies with a substantially flat bottom surface and an irregular top surface in a horizontal as-baked attitude in series along a predetermined path toward a loading station, slowing the movement of the cookies at a first station along the path to position the cookies in edge-to-edge abutment, accelerating the cookies at a second station along the path and establishing the cookies in substantially equally spaced relationship as they approach the loading station, reorienting each of the cookies to an edge standing attitude with the irregular top surface leading the substantially flat bottom surface and depositing the cookies into the receiving area of a loading cavity at the loading station while maintaining the cookies spaced apart until they are deposited in the loading cavity, moving a lead finger through the loading cavity away from the receiving area as the cookies are deposited into the loading cavity to maintain the first cookie in an edge standing attitude, and after a predetermined number of cookies have been deposited in the loading cavity, inverting the loading cavity to deposit the cookies into a receptacle.

16. The method of claim 15 and further including the step of progressively moving a series of receptacles beneath the loading cavity for receiving the cookies from the loading cavity.

17. The method of claim 15 and wherein the loading cavity is formed in a turret and the step of inverting the loading cavity comprises rotating the turret about a horizontal axis until the loading cavity is moved from an upwardly facing attitude to a downwardly facing attitude.

18. The method of claim 15 and wherein the step of reorienting each of the cookies to an edge standing attitude comprises moving each cookie in sequence into the slot of a loading wheel and rotating the loading wheel about a horizontal axis until the cookie is in an edge standing attitude, and wherein the step of depositing the cookies in the receiving area of the loading cavity comprises raking each cookie out of the loading wheel and pushing each cookie into the loading cavity.

19. Apparatus for loading cookies and the like each having a substantially flat bottom surface and an irregularly shaped upper surface in a receptacle comprising a loading turret rotatable about an approximately horizontal axis, said turret including at least one loading cell extending longitudinally of said turret, surface conveyor means for moving cookies in a horizontal as-baked attitude resting on their bottom surfaces along a path in series toward said turret, a loading wheel between said surface conveyor means and said turret and rotatable about a horizontal axis extending across the path and having at least one slot for receiving a cookie from said conveyor means in an approximately horizontal attitude and for reorienting the cookie to an edge standing attitude with the irregularly shaped surface leading the flat bottom surface, means for urging the cookie from said loading wheel into the loading cell of said turret as the cookie moves into an edge standing attitude, said loading wheel including an outer rounded surface for engaging the flat bottom surface of the cookie and pushing the cookie into the loading cell of said turret, and drive means for operating said surface conveyor means, said loading wheel and said turret in timed relationship.

20. The apparatus of claim 19 further including means for holding the first cookie delivered to the loading cell of said turret in an edge standing attitude.

21. The apparatus of claim 20 and wherein said means for holding the first cookie delivered to the loading cell of said turret comprises a lead finger reciprocatable along the length of the loading cell, and wherein said drive means operates said lead finger in timed relationship with said surface conveyor means, said loading wheel and said turret.

22. The apparatus of claim 19 and further including first detection means for detecting the presence of cookies being moved by said surface conveyor means at a first position along said path, and a second detection means for detecting the presence of cookies being moved by said surface conveyor means at a second position along said path which is upstream from said first position along said path, and control means responsive to the detection by said first detection means of cookies being moved in edge-to-edge relationship with one another to operate said drive means at a first speed of operation and responsive to the detection by said second detection means of cookies being moved in edge-to-edge relationship with one another to operate said drive means at a second speed of operation which is faster than said first speed of operation.

23. Apparatus of claim 19 and further including means for detecting more than one layer of cookies moving on said surface conveyor means, and ejecting means responsive to said means for detecting to remove the top layers of cookies from the lower layer of cookies.

24. Apparatus of claim 19 and further including control means for forming a gap in the series of cookies being moved toward said turret and for rotating said turret as the gap in the series of cookies reaches said turret.

25. Apparatus for loading cookies and the like in a receptacle comprising a loading turret rotatable about an approximately horizontal axis, said turret including at least one loading cell extending longitudinally of said turret, surface conveyor means for moving cookies in a horizontal as-baked attitude along a path in series toward said turret, a loading wheel rotatable about a horizontal axis extending across the path and having at least one slot for receiving a cookie from said conveyor means in an approximately horizontal attitude and for reorienting the cookie to an edge standing attitude, means for urging the cookie from said loading wheel into the loading cell of said turret as the cookie moves into an edge standing attitude, said surface conveyor means comprising a first belt conveyor means, belt drive means for driving said first belt conveyor means at a predetermined velocity to move cookies in a horizontal as-baked attitude in random spaced positions, a second belt conveyor means aligned with said first belt conveyor means for receiving cookies from said first belt conveyor means, a pin surface conveyor means for pushing cookies to said loading wheel, transfer means positioned between said second belt conveyor means and said pin surface conveyor means for moving cookies from said second belt conveyor means to said pin surface conveyor means at a velocity greater than the velocity of said second belt conveyor means, and drive means for operating said second belt conveyor means, said pin surface conveyor means and said transfer means in timed relationship wtih said loading wheel and said turret.

26. The apparatus of claim 25 and further including first detection means for detecting the presence of cookies about to be moved off said first belt conveyor and onto said second belt conveyor, and second detection means for detecting the presence of cookies at a position upstream from said first detection means, and control means responsive to the detection by said first detection means of cookies being moved in edge-to-edge relationship with one another to operate said drive means at a first speed of operation and responsive to the detection by said second detection means of cookies being moved in edge-to-edge relationship with one another to operate said drive means at a second speed of operation which is faster than the first speed of operation.

* * * * *